Sept. 20, 1966  F. MAYER  3,273,594
ELECTROHYDRAULIC ACTUATOR
Filed May 26, 1961  3 Sheets-Sheet 1

INVENTOR
FERDY MAYER
BY Irwin S. Thompson
ATTY.

Sept. 20, 1966          F. MAYER          3,273,594
ELECTROHYDRAULIC ACTUATOR
Filed May 26, 1961          3 Sheets-Sheet 2
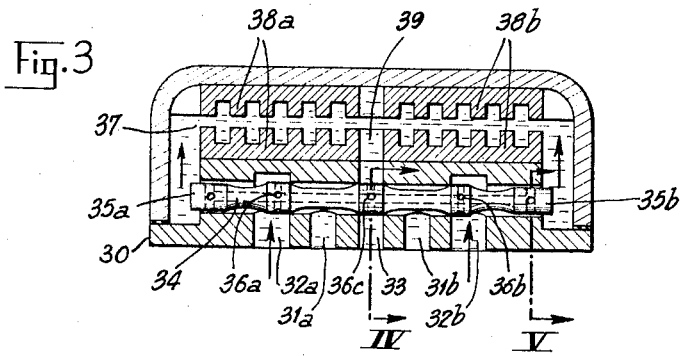
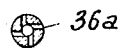
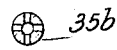
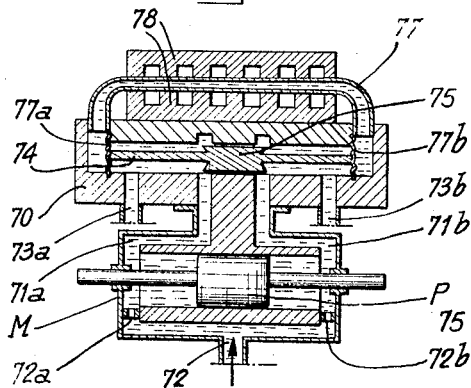
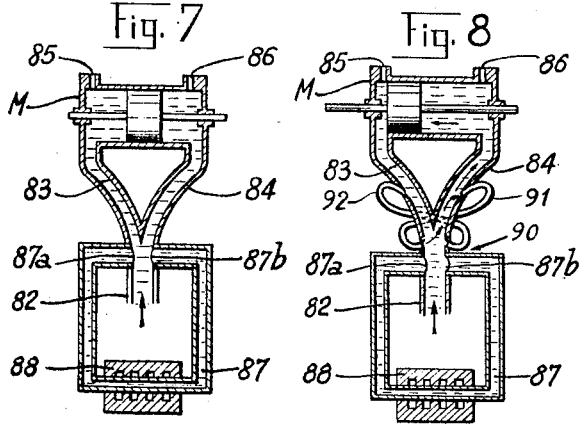
INVENTOR
FERDY MAYER
BY Irwin S. Thompson
ATTY.

Sept. 20, 1966  F. MAYER  3,273,594
ELECTROHYDRAULIC ACTUATOR
Filed May 26, 1961  3 Sheets-Sheet 3

INVENTOR
FERDY MAYER
By Irwin S. Thompson
ATTY.

United States Patent Office 3,273,594
Patented Sept. 20, 1966

3,273,594
ELECTROHYDRAULIC ACTUATOR
Ferdy Mayer, Grenoble, France, assignor to Inventions Finance Corporation, a corporation of Delaware
Filed May 26, 1961, Ser. No. 112,915
Claims priority, application France, May 27, 1960, 4,249
3 Claims. (Cl. 137—625.66)

Hydraulic machines, whether reciprocating or rotating, serve in numerous control systems and are of a particular interest for controlling large powers.

In all cases where the control of such machines is of an electric or electronic type, it is necessary to produce a transformation of electric energy into mechanical energy, which latter acts on a hydraulic amplifier through the agency of means distributing a liquid stream. Said double electromechanical and mechanical-hydraulic transformation is produced by an actuator forming the most important section of the control system.

Numerous industrial embodiments of such actuators are known. They all resort to an electric motor such as a motor including a movable winding as used for loud speakers, or else, a motor producing a rotary torque, or again, a motor including a magnetic armature subjected to a differential flux. In most of said prior embodiments, the electric motor acts through the agency of a spindle, a rod, a lever or a small blade on the output of a hydraulic amplifying relay, which latter actuates finally the distributing slide valve of the hydraulic machine.

In other improved embodiments, the mechanical connection between the electric motor and the slide valve of the distributor is cut out and said slide valve of a flat type, made of a conductive magnetic material, forms the actual armature of a special asynchronous motor.

The present invention has for its object a novel type of improved actuators, wherein the electric action of the field-piece of the electric motor is exerted directly on a conductive liquid enclosed inside a pipe, the propelling force exerted on the liquid and transmitted by the latter acting on the distribution for the hydraulic machine.

The invention is based on the well-known principle consisting in that a conductive fluid through which an electric current is fed, while it is submitted to a magnetic induction, is subjected to a force perpendicular both to the current and to the induction field.

The electric current may be fed directly to the liquid and the operation is then similar to that of a D.C. motor. The electric current may also be obtained through a varying induction produced by an alternating field and the operation, in such a case, is similar to that of an asynchronous motor. The different embodiments according to the invention will preferably resort to this second arrangement.

According to the invention, the action of the conductive liquid may be exerted on a distributing slide valve, either directly without any separation between the circuit containing the conductive liquid and the general distributing circuit, or else, a diaphragm may separate the conductive liquid in the electric motor from the fluid in the distributing circuit.

According to a further arrangement, the action of the conductive liquid may be exerted on diaphragms acting differentially so as to adjust directly the flow feeding permanently the hydraulic machine without it being necessary to resort to a distributing slide valve.

The invention covers also various applications to be considered inter alia for actuators of the type referred to, either in the case of the actual control of hydraulic machines, or else, of the execution of various apparatus adapted to operate through the movements of a hydraulic liquid acting either directly or with the interposition of diaphragms or the like parts. Thus, for instance, according to a particular application of the invention, the actuators described allow executing the shifting of a hydraulic flux towards either of two output channels; a particular object of the invention consists in applying said shifting of a flow of liquid to the constitution of logic circuits and of electrohydraulic calculators.

The features and advantages of the present invention will appear furthermore from the reading of the following description of various embodiments and applications thereof, reference being made to the accompanying drawings, wherein:

FIG. 3 is a sectional view of a second modification.

FIGS. 4 and 5 are detail sectional views of the distributing slide valve through section lines IV and V of FIG. 3 respectively.

FIG. 6 is a sectional view of a third modification of the improved actuator associated with a hydraulic motor controlled by said actuator.

FIG. 7 is a sectional view of a fourth actuator according to the invention, associated with a hydraulic motor.

FIG. 8 illustrates a modification of the arrangement according to FIG. 7, forming a bistable electrohydraulic system.

Figure 1:
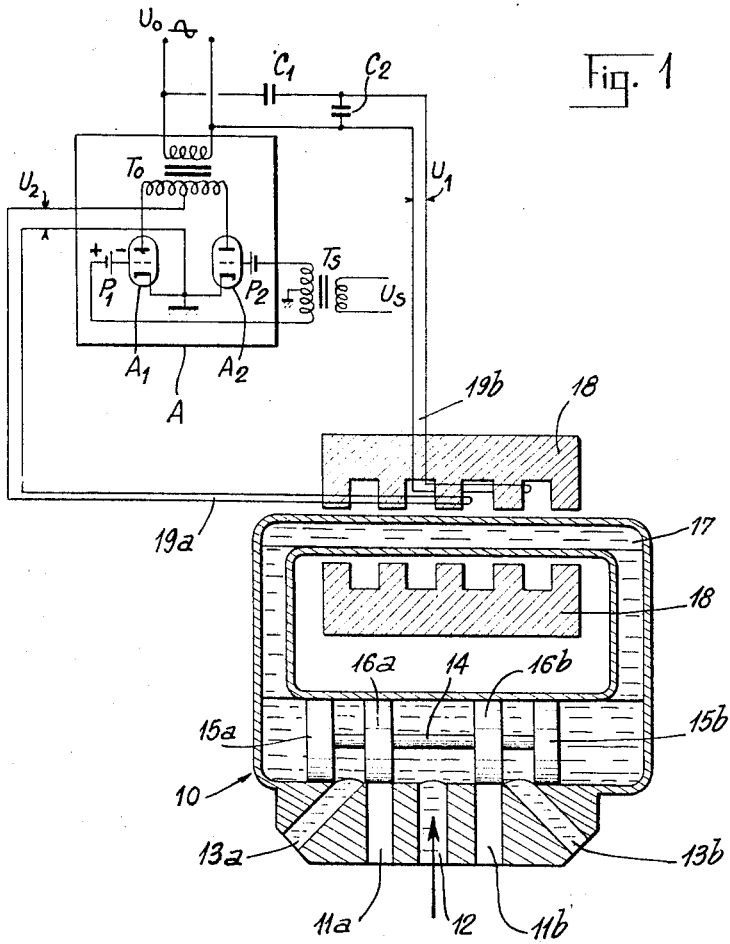
FIG. 1 is a sectional view of a first actuator according to the invention, said view being associated with a wiring diagram illustrating an electric control circuit.

Turning to FIG. 1, it illustrates diagrammatically a distributor 10 connected with the two ends of a hydraulic motor which is not illustrated, through pipes 11a and 11b. The fluid under pressure is fed into the distributor through the pipe 12, while the pipes 13a and 13b serve for the exhaust of liquid. The distributing piston 14 is provided with two terminal collars 15a and 15b and with two intermediate collars 16a and 16b.

The two ends of the distributor are interconnected through a pipe 17 filled with a liquid, the conductivity of which is as high as possible. Apart from mercury which is hardly suitable by reason of its high specific weight, it is possible to resort to molten metal alloys which are liquid at room temperature. It is possible to use, for instance, the eutectic alloy Na-K which is liquid above −19° C. and is advantageous by reason of its low specific weight.

The stator section 18 of a linear asynchronous motor is arranged in the vicinity of a rectilinear section of the pipe 17. It includes two separate windings 19a and 19b arranged with a relative shifting by one quarter of a polar pitch. The two windings are fed by A.C. voltages at 90° from each other; one of them, U1, is unvarying and forms the reference phase, while the other, U2, which is suitably phase-shifted with reference to U1, is controlled as to amplitude, by a controlling or signalling voltage Us.

FIG. 1 includes an example of a wiring diagram which allows such an electric control. The voltage U1 forming the reference phase is collected across the terminals of a supply of A.C. voltage Uo through the agency of a phase shifting cell including a capacitor in series C1 and a capacitor in parallel C2. The voltage U1 is thus phase-shifted by 90° with reference to Uo. The other voltage U2 is collected at the output of a modulating amplifier A provided with two inputs. The voltage Uo is applied to one of said inputs constituted by the terminals of the primary winding of a transformer To, while the controlling or signalling voltage Us is applied to the other input formed by the terminals of the primary winding of a transformer Ts. The control grids of the triodes A1 and A2 are connected through the agency of suitable supplies P1 and P2 of biasing voltages to the terminals of the symmetrical secondary of the transformer Ts, the medial point of which secondary is grounded. On the other hand, the cathodes of the two triodes are grounded, while their anodes are connected with the terminals of the secondary winding of the transformer To which is also symmetrical, while the output U2 is collected between the medial point of last-mentioned secondary winding and ground.

It is easy to see, provided the modifications in the control voltage Us are sufficiently slow with reference to the frequency of the A.C. voltage Uo, that the voltage Us applied by such a circuit is an alternating voltage having the same fundamental frequency as the voltage Uo which is in phase or in phase opposition with reference to the latter, and the amplitude of which is proportional to that of the control voltage Us.

There is thus obtained through the currents induced in the conductive liquid flowing through the pipe 17, a propelling force which is variable as to amplitude and which is directed in either direction according to the relationship between U2 and U1. Said propelling force which is transmitted by the liquid acts directly on the distributor piston 14.

When the system is inoperative, the collars 16a and 16b close the pipes 11a and 11b. The electric control signals sent into the windings 19 produce a predetermined propulsion of the conductive liquid, which leads to a shifting of the distributor piston 14. The ports at the ends of the pipes 11a and 11b are thus partly uncovered, so that the pipe 11a is connected with the pipe 12 feeding fluid under pressure, while the pipe 11b is connected with the exhaust pipe 13b, or reversely, the pipe 11b is connected with the pipe 12 and the pipe 11a with the pipe 13a.

Figure 2:
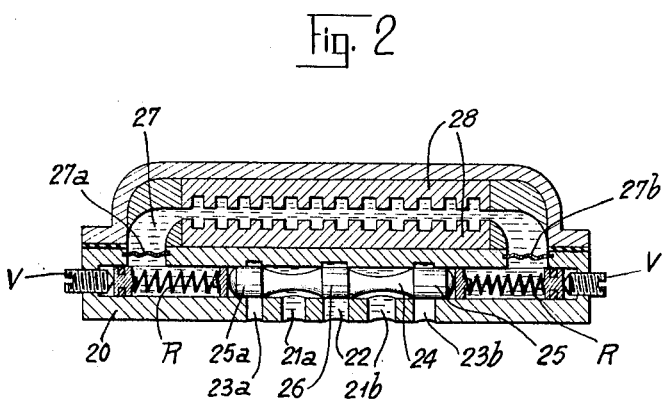
FIG. 2 is a sectional view of a modification of the actuator illustrated in FIG. 1.

FIG. 2 illustrates a modification wherein the distributor 20, the pipes 21a and 21b connected with the hydraulic motor, are similar to the corresponding parts in FIG. 1, as also the distributor piston 24 provided with its two terminal collars 25a and 25b and a single intermediate collar 26 and the connecting pipe 27 filled with a conductive liquid and, lastly, the stator elements 28 of a linear asynchronous motor.

However, in said modification, the conductive liquid filling the pipe 27 is separated from the general distributor circuit by yielding diaphragms 27a and 27b which are, for instance, made of stainless steel. The space separating each diaphragm from the corresponding end of the distributor piston is filled with a driving fluid to which the diaphragm transmits the propelling force exerted by the conductive fluid.

Furthermore, springs R which may be adjusted from the outside through screws V, allow adjusting the neutral position of the piston and the return action of the springs R. Said return action produces proportionality in the hydraulic control.

In all the arrangements according to the invention, it is attempted to produce a symmetry as perfect as possible in the apparatus with a view to reducing or even cutting out the influence of any external acceleration or vibration.

FIG. 3 shows a further embodiment which is suitable for the case where the controlled hydraulic motor uses as a driving fluid the same conductive liquid as the actuator. The distributor 30 connected with the hydraulic motor through the pipes 31a and 31b includes two pipes 32a and 32b for the admission of the fluid flowing under pressure and a single control exhaust pipe 33.

The piston 34 of the distributor is provided in this case with five collars, to wit: two terminal collars 35a and 35b, the diameter of which is slightly lower than the bores in which they are to move, two intermediate collars 36a and 36b and a central collar 36c in registry with which there is provided a passageway 39 adapted to connect directly the pipe 37 filled with the conductive liquid with the exhaust pipe 33. The stator elements 38a and 38b form two electric motors arranged to either side of the pipe 37.

The operation of the arrangement is as follows:

Starting from the pipe 32a and 32b feeding the liquid under pressure and the space provided between the collars 35a and 35b and the corresponding sections of the bore in which the slide valve moves, there are two permanent leak outputs passing through the asynchronous motors and centrally out of the actuator at 39 and 33. In the absence of any electric signal acting on the two electric motors, the leaks are equal on both sides and the piston 34 remains in its central inoperative position. In the case of a differential signal, appearing, for instance, under the action of fields in one electric motor adapted to produce a propelling force in the conductive liquid in the same direction as the flow of the latter and in a direction opposing the flow in the other motor, the losses of hydraulic loads are different on the two sides of the actuator and the piston 34 moves until a modified distribution of the output restores the equilibrium of pressures on the two ends of the piston. The shifting of the piston thus obtained is proportional to the magnitude of the control signal; this forms a hydrodynamic effect which replaces the action of the actuator springs described with reference to FIG. 2.

Inside the body and the collars of the piston 34, there are provided axial and radial passageways (FIGS. 4 and 5). The eccentric arrangement of the radial passageways in the three collars 36 (FIG. 4) is such that the flow produces through reaction, in a manner well known per se, a rotation of the distributor piston with a view to removing friction. The radial passageways in the two terminal collars 35 (FIG. 5) are, in contradistinction, symmetrical and have merely for their object to distribute uniformly the flow in the annular gaps surrounding said collars.

FIG. 6 shows a further embodiment which cuts out the piston moving under frictional conditions. The fluid under pressure is fed by the pipe 72 and the gauged ports 72a and 72b to either side of the piston P of the hydraulic motor M. Two pipes 71a and 71b connect the two ends of the motor M with the body of the distributor 70 which is provided with two exhaust pipes 73a and 73b. A shiftable member 74, the ends of which are rigidly secured to the central section of the two diaphragms 77a and 77b, is provided with a central collar 75 adjusting the outputs fed through the two pipes 71a and 71b to the distributor. The pipe 77 filled with the conductive fluid extends between the stator elements 78 of the electric motor.

For a medial inoperative position of the shiftable member 74, the outputs through 71a and 71b are equal and the piston P which is subjected to equal pressures at its ends is stationary.

For a predetermined electric signal, the propelling force generated in the conductive fluid acts on the diaphragms 77a and 77b, which leads to an axial shifting of the member 74. The outputs through 71a and 71b are now different, which produces between the ends of the piston P a differential pressure ascribable to the difference between the losses of load in the gauged ports 72a and 72b.

FIG. 7 illustrates an actuator according to the invention which is no longer provided with a distributing slide valve or the like part.

The hydraulic machine M is fed with fluid under pressure by a pipe 82 which opens into two branch pipes 83 and 84 leading to the two ends of said machine M, which are provided each with a gauged exhaust opening 85 or 86. The pipe 87 filled with the conductive liquid and extending between the stators 88 of the electric motor, leads to either side of the pipe 82 and in the vicinity of the starting points of the branch pipes 83 and 84 to yielding diaphragms 87a and 87b separating said conductive liquid from the liquid flowing through said pipe 82, said diaphragms forming wall sections of the pipe 82.

In the absence of any electric signal, the diaphragms 87a and 87b occupy positions which are symmetrical with reference to the axis of the pipe 82, the output of which is subdivided equally between branch pipes 83 and 84, while the piston P remains stationary.

The propelling force produced by an electric signal produces deformations in the diaphragms 87a and 87b and the result thereof is to direct a larger fraction of the fluid output under pressure towards either of said branch pipes 83 or 84, whereby a modification in the equilibrium of the pressures is obtained in either side of the piston P.

FIG. 8 illustrates a modification of the arrangement according to FIG. 7, which allows transforming said arrangement into an electrically controlled bistable hydraulic arrangement. The references already used in FIG. 7 serve again in FIG. 8 for designating identical or equivalent elements and it is apparent that the modification introduced in FIG. 8 consists chiefly in the provision of two so-called reaction or recycling channels 91 and 92. These channels open into a section 90 of the pipe 82 feeding the fluid under pressure between the diaphragms 87a and 87b ahead of the forked end of the pipe 82 opening into the branch pipes 83 and 84. The channel 91 opens into said section in registry with the left-hand diaphragm 87a and starts from the right-hand branch pipe 84, while, conversely, the channel 92 terminating in registry with the right-hand diaphragm 87b starts from the left-hand branch pipe 83. As illustrated, the starting portions of the channels 91 and 92 are preferably sloping so as to form an acute angle with the axis of the corresponding branch pipe, facing the normal direction of flow.

The operation of said auxiliary channels is obvious: for an electric control operating in the direction of the arrow, the left-hand diaphragm 87a is urged towards the right-hand side, and the hydraulic flux passing out of 82 is deflected towards the right-hand branch pipe 84; a fraction of said flux enters the reaction channel 91 and locks the flux in its right-hand direction so that the piston in the hydraulic machine M is stabilized in the left-hand position illustrated. In order to shift the flow towards the left-hand branch pipe 83, it is sufficient to produce a control in the opposite direction; this leads therefore to the obtention of two stable conditions, which characterizes a bistable system forming the basic element of logic circuits.

In the particular case where the hydraulic liquid is also conductive, it is obviously possible to ensure directly the shifting of the flux into either of two tracks through a linear induction motor.

Figure 9:
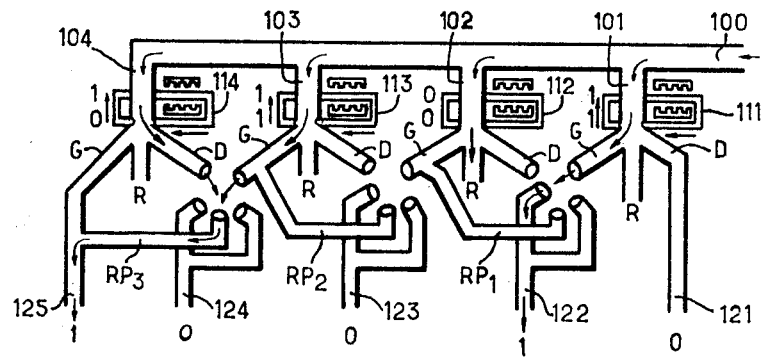
FIG. 9 is a diagrammatic showing of a binary adding machine of an electrohydraulic type.

FIG. 9 illustrates an example of the application of systems thus designed to the constitution of a binary adding machine controlled electrically and providing hydraulic indications. Pipes 101, 102, 103 and 104 fed in parallel by the channel 100 with the hydraulic liquid, are equipped each with an actuator according to the invention; said actuators illustrated diagrammatically at 111, 112, 113 and 114, control the shifting of the hydraulic flux towards either of two pipes G and D and providing for a shifing towards the left-hand side and towards the right-hand side respectively according to the sign of the control signal received, while they allow the return of the flux through a return pipe R in the absence of any control signal. The binary significations 11, 01, 00 are allotted to the three cases. The diagram shows, on the other hand, how the outputs G and D of four successive actuators 111 to 114 are connected with the five general output ports 121 to 125 forming, in the present case, the means for hydraulically indicating the successive digits of a binary number.

Thus, the output 121 forms the indicator member for the "units" and is connected with the output D of the stage 11 and indicates the binary digit 0 or 1 according as to whether it receives a flow of liquid from said output or otherwise. The output 122 forms the means for indicating the "tens" and is adapted to receive the flow out of the output G of the stage 111 or of the output D of the stage 112. When these two outputs (G of 11 and D of 112) feed simultaneously, their associated fluxes are collected by a transfer channel RP1 and sent by the latter into the output G of the stage 112, and so on.

The actuators forming the stages 111 to 114 are assumed, on the other hand, to be designed so as to receive two electric control signals corresponding respectively to the successive digits of two binary numbers comprising four digits, so as to exert a control in the direction of G when the two digits are 1 and 1, a control in the direction of D when one of said digits is 1 and the other 0, and no control at all when the two digits are both zero.

FIG. 9 shows also how, in the case of the addition of two binary numbers 0101 and 1101 obtained by shiftings of the hydraulic fluxes in the actuators, their sum which is 10010 appears at the outputs 121 to 125.

In the particular case where the hydraulic liquid is also conductive, it is obviously possible to act directly on the fluxes R1 and R2 through a linear induction motor.

Numerous other applications may be considered in the field of the high power driving means. In comparison with the conventional electric motors, this leads to the advantages of a very speedy response and of the cutting out of the blades of the conventional hydraulic motors and pumps and, often, it is of interest also to resort to a small-sized motor of a mechanical type, that is a hydraulic machine, at the point of operation.

Figure 10:
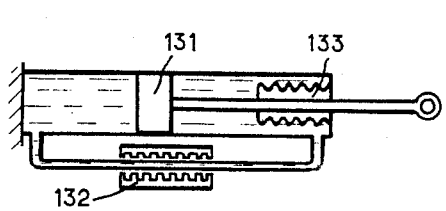
FIGS. 10 to 13 illustrate diagrammatically the applications of the invention to a hydraulic jack, to a graphic recorder, to a perforating machine, to a diaphragm pump respectively.

FIG. 10 shows the execution of a hydraulic jack controlled by the actuator motor. In said figure, 131 designates the movable piston of the jack, 132 the actuator and 133 a fluidtight diaphragm. Instead of the piston, it is obviously possible to use a conventional hydraulic motor with a view to obtaining the desired rotary movements.

Figure 11:
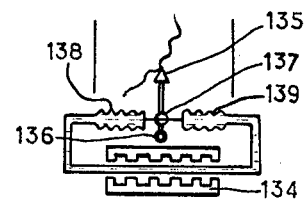

The same idea is resorted to in the case of FIG. 11 for obtaining a speedy graphic record under electric control. The recording stylus 135 is revolvably carried by a spindle 136 and is coupled at 137 with two members 138 and 139 which may be constituted by diaphragms or pistons and which are adapted to move mechanically under the action of an actuator 140. The conventional control techniques may obviously be used.

Figure 12:
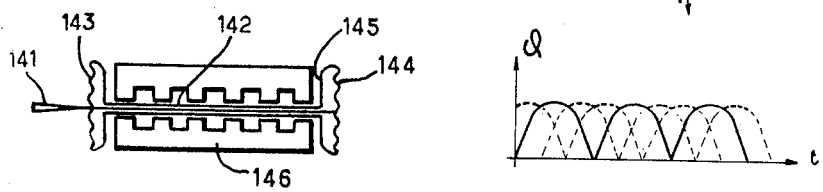

FIG. 12 shows the execution of an apparatus for the speedy perforation of a perforated ribbon; a perforating punch 141 is carried at the end of an axial rod 142 carried by two diaphragms 143 and 144 forming the ends of a chamber 145 inside which is confined the conductive hydraulic liquid for the motor 146. The stroke required, which is of a magnitude of 1 mm. under a pressure of a few kgs., may be obtained by a small system, the size of which is about double that of FIG. 12; frequencies of perforation rising up to 250 strokes per second may be obtained.

In this case, it is obviously necessary to obtain a reciprocatory movement, that is, an electric control of the control phase of the electric circuit.

Figure 13:
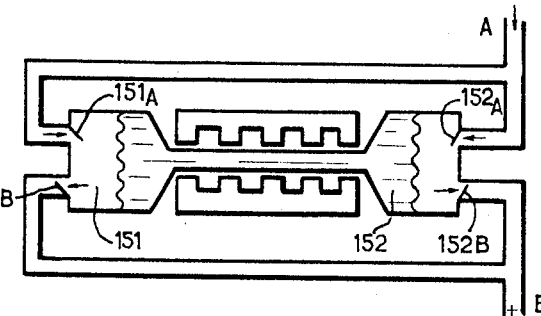

The same is the case for the arrangement illustrated in FIG. 13 which illustrates a pump with two diaphragms 151 and 152. Said diaphragms execute a reciprocatory movement in registry with corresponding valves illustrated diagrammatically at 151A, 151B, and 152A, 152B, said valves controlling the entrance into the corresponding input pipe A and output pipe B.

Figure 14:
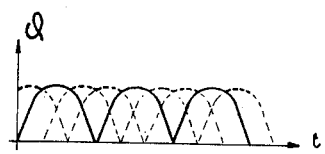
FIG. 14 is an explanatory graph.

FIG. 14 shows in solid lines a curve illustrating the output Q obtained with such a pump for a sinusoidal energization. It is a very simple matter to couple in parallel the outputs of a number of such pumps and if the electric circuits are energized by a polyphase current, it is possible to obtain a perfect uniformity of output. The curve illustrated in dotted lines corresponds, for instance, to the output obtained with three pumps in parallel, which are fed with three-phase current.

Obviously, many modifications may be imagined for all the arrangements disclosed within the scope of the accompanying claims. Many industrial applications may be considered, which resort to the advantages inherent to the technique described, to wit: a direct and rapid action of a magnetic field as produced by an electric current on a conductive liquid.

What I claim is:

1. A fluid actuator comprising an electric motor fieldpiece, means feeding said fieldpiece with electric signals, a channel including a section extending in the immediate vicinity of said fieldpiece, liquid filling said channel, at least the liquid in said section of the channel being conductive and being subjected to a propelling action by the modifications in the field produced by the signals in said fieldpiece, means for varying the characteristics of said signals thereby to vary the strength of said field, and a slide member disposed in said channel for reciprocatory sliding movement and having opposite end portions communicating with the liquid in the channel on opposite sides of said fieldpiece, the cross-sectional area and configuration of said end portions being matched to the cross-sectional area and configuration of said section of said channel, so that said slide member reciprocates with a force and velocity matched to the optimum power fluid distribution conditions, when said conductive liquid reciprocates in said section of said channel under the optimum electric motor performance conditions.

2. A fluid actuator as claimed in claim 1, and diaphragm means disposed in said channel on opposite sides of said slide member and sealing the slide member from said conductive liquid.

3. A fluid actuator as claimed in claim 1, the line along which said slide member reciprocates being displaced from the line along which said conductive liquid in said section of said channel reciprocates.

References Cited by the Examiner

UNITED STATES PATENTS

| | | | |
|---|---|---|---|
| 1,792,449 | 2/1931 | Spencer | 310—11 |
| 2,634,086 | 4/1953 | Johns | 137—625.64 X |
| 2,661,596 | 12/1953 | Winslow | 60—52 |
| 2,928,409 | 3/1960 | Johnson et al. | 103—1 X |
| 2,949,784 | 8/1960 | Maeder | 103—1 |
| 2,955,617 | 10/1960 | Collins | 137—625.64 |
| 2,961,001 | 11/1960 | Pippenger | 137—623 |
| 2,969,808 | 1/1961 | Horlacher | 137—623 |
| 2,987,050 | 6/1961 | Oppenhimer et al. | 137—625.69 X |
| 3,001,698 | 9/1961 | Warren | 235—61 |
| 3,005,313 | 10/1961 | Carlson | 103—1 X |
| 3,010,649 | 11/1961 | Glatti | 235—61 |
| 3,026,807 | 3/1962 | Hutchinson et al. | 310—11 X |
| 3,052,097 | 9/1962 | Tyrner | 103—1 X |

M. CARY NELSON, *Primary Examiner.*

WALTER W. BURNS, Jr., LAVERNE D. GEIGER, MARTIN P. SCHWADRON, *Examiners.*

B. REIN, E. REICHERT, S. SCOTT,
*Assistant Examiners.*